United States Patent [19]
Beziat

[11] 3,885,648
[45] May 27, 1975

[54] BAYONET - TYPE CONNECTION
[75] Inventor: Bernard Beziat, Carrieres sur Seine, France
[73] Assignee: Societe Nouvelle des Echafaudages Tubulaires Mills, Le Bourget, France
[22] Filed: Jan. 8, 1974
[21] Appl. No.: 431,744

[30] Foreign Application Priority Data
Jan. 31, 1973 France .............................. 73.03425

[52] U.S. Cl. ................ 182/178; 403/349; 403/350; 52/638
[51] Int. Cl. ............................................ E04g 1/06
[58] Field of Search ............ 182/178; 403/349, 350, 403/343; 285/361, 396, 401, 402; 52/637, 638

[56] References Cited
UNITED STATES PATENTS

| | | | |
|---|---|---|---|
| 1,873,241 | 8/1932 | Wright | 403/349 |
| 2,833,421 | 5/1958 | Skubic | 182/178 |
| 3,095,070 | 6/1963 | McDonald | 182/178 |
| 3,532,369 | 10/1970 | Reilly | 403/350 |
| 3,736,714 | 6/1973 | Brenner | 403/349 |

Primary Examiner—Reinaldo P. Machado
Attorney, Agent, or Firm—Larson, Taylor and Hinds

[57] ABSTRACT

A bayonet-type connection has the female socket having axially extending radially outwardly deformed sections to accommodate the bayonet catch. Perforations accommodate the catch to make the connection on relative rotation of the male and female parts.

7 Claims, 6 Drawing Figures

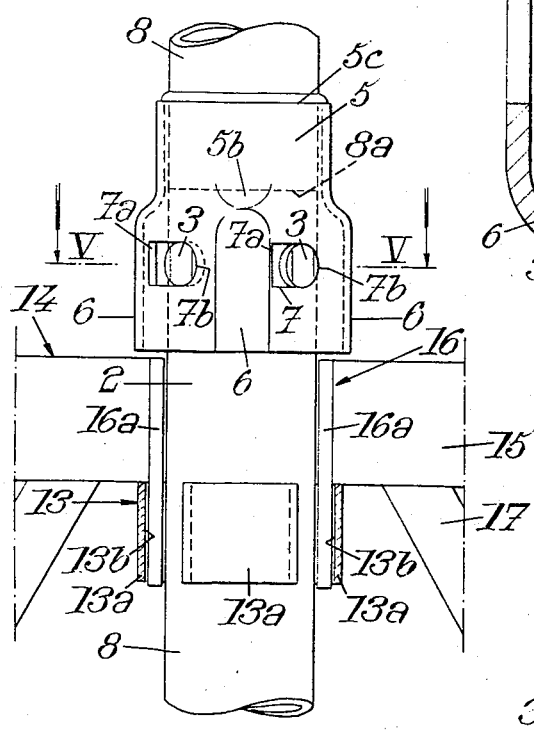
Fig. 3.
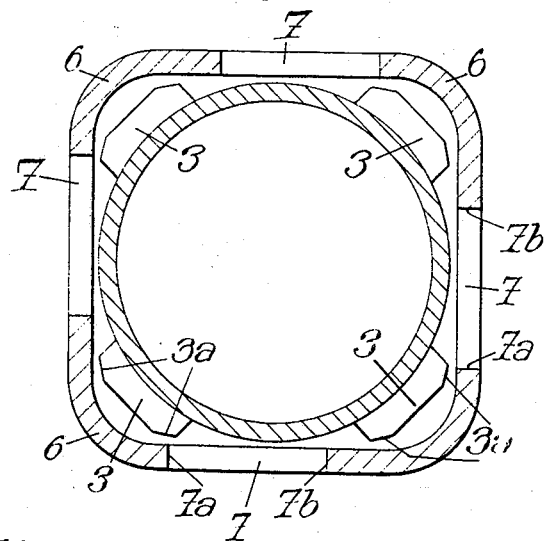
Fig. 4.
Fig. 5.

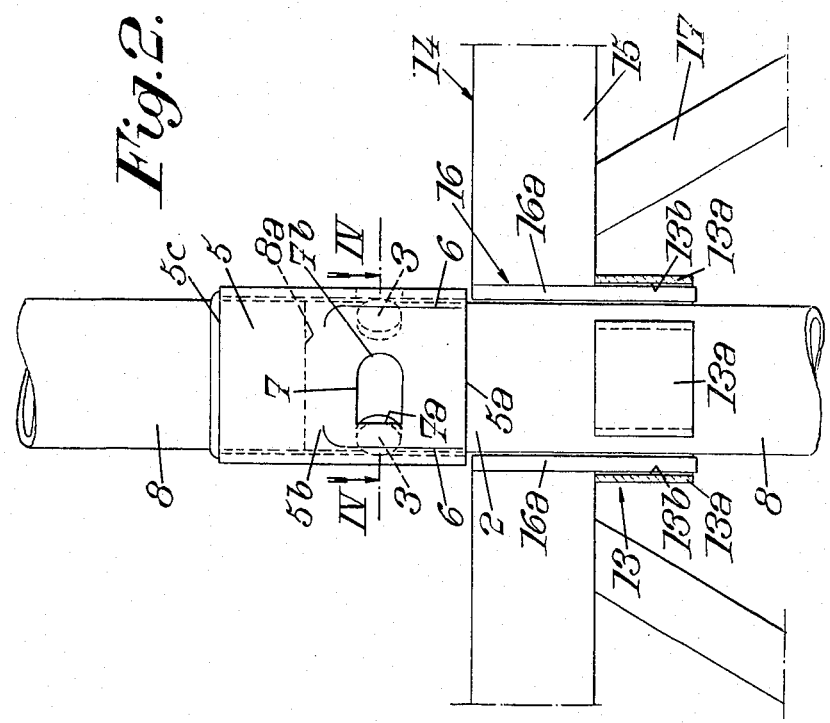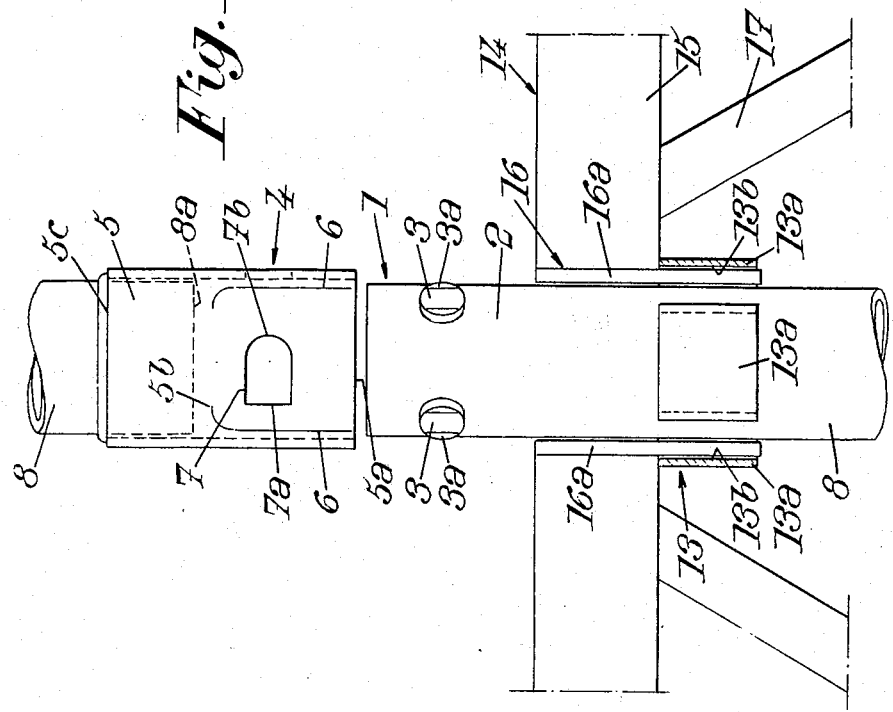

BAYONET - TYPE CONNECTION

The invention relates to bayonet-type connections comprising a male element formed by a cylindrical section having at least one radial catch, and a female element adapted to receive such male element and produce an axial locking effect once the male element has been suitably encased in the female element and a relative rotary movement has taken place between the male and female elements.

Amongst such connections, the invention relates particularly, but not exclusively, to connections adapted to interconnect the vertical uprights of scaffoldings, inter alia tubular scaffoldings.

Hitherto the female element has been so constructed as to be formed with one or more axial grooves corresponding to the catch or catches of the male element respectively, each axial groove being made in all or part of the thickness of the wall of the female element and terminating in offset recess adapted to receive the catch after the relative rotary movement has taken place between the male and female elements.

One of the two following methods could then be adopted to make a female element of this kind.

In the first method, material was removed over the whole thickness of the wall of the female element to produce each axial groove and its offset recess. However, this method resulted in a mechanical weakening of the female element which might therefore be deformed in a way making it difficult if not impossible to encase the male element, the risk of deformation being particularly considerable when the invention was applied to scaffoldings.

In the other method a portion only of the thickness of the wall of the female element was removed (on the inside of the wall) to produce each axial groove and its offset recess. However, this method resulted in the high manufacturing cost, since either machining had to be performed, or a female element had to be produced so moulded as to obtain the axial groove and the offset recess, and in practice the cost of the construction makes it impossible to envisage this method for application to scaffoldings.

It is an object of the invention to provide an assembly which is robust at the level of its female element and can be produced at a relatively low cost.

The assembly according to the invention is characterised in that the female element is formed by a tubular section having at least one deformed zone extending axially from one of the ends of such section to a central region, and at least one perforate zone disposed between the central zone and such end, the perforate zone being offset in relation to the deformed zone, the deformed zone extending radially to allow the passage of the radial catch of the male element, and the perforate zone having an opening such that the radial catch takes up position therein when the relative rotary movement has taken place between the male and female elements.

One advantageous embodiment of the invention is characterised in that the female element is formed by a cylindrical tubular section having four deformed zones disposed at 90° between its central region and one of its ends, and two perforate zones which are diametrically opposite — i.e., disposed at 180° — or four perforate zones disposed at 90°; that portion of the cylindrical tubular section which is disposed between its central region and its other end retains its cylindrical shape so that if necessary it can co-operate (for instance by joining and welding) with the end of a cylindrical tube scaffolding upright. In these conditions the male element is formed with two diametrically opposed catches — i.e., disposed at 180° — or four catches disposed at 90°.

The invention also relates to the manufacturing processes by encasing and rotation.

In the method according to the invention the female element is produced: by so deforming a cylindrical tubular section as to produce at least one deformed zone extending axially from one of the ends of the section to a central region; and so removing material as to produce at least one perforate zone disposed between such central region and said end, the perforate zone being offset in relation to the deformed zone; such deformation and material-removal operations being so performed that the deformed zone extends radially to allow the passage of the radial catch of the male element and the perforate zone has an opening such that the radial catch takes up position therein when the relative rotary movement has taken place between the male and female elements.

Apart from the above-described arrangements, the invention also comprises certain other arrangements which are preferably used simultaneously and which will be described in greater detail hereinafter.

In any case, the invention can be clearly understood from the following description and the accompanying drawings which are of course non-limitative and relate to a preferred embodiment of the invention. In the drawings:

FIG. 1 is an elevation of an assembly according to the invention, the male and female elements of the assembly being shown in the position which they occupy before encasing;

FIG. 2 is similar to FIG. 1, but the male and female elements are shown in the position which they occupy after encasing but before their relative rotary movement has taken place;

FIG. 3 is similar to FIGS. 1 and 2, the male and female elements being shown in the position which they occupy after encasing and after the relative rotary movement has taken place;

FIG. 4 is a section, to an enlarged scale, taken along the line IV—IV in FIG. 2;

FIG. 5 is a section, to an enlarged scale, taken along the line V—V in FIG. 3;

Figure 6:
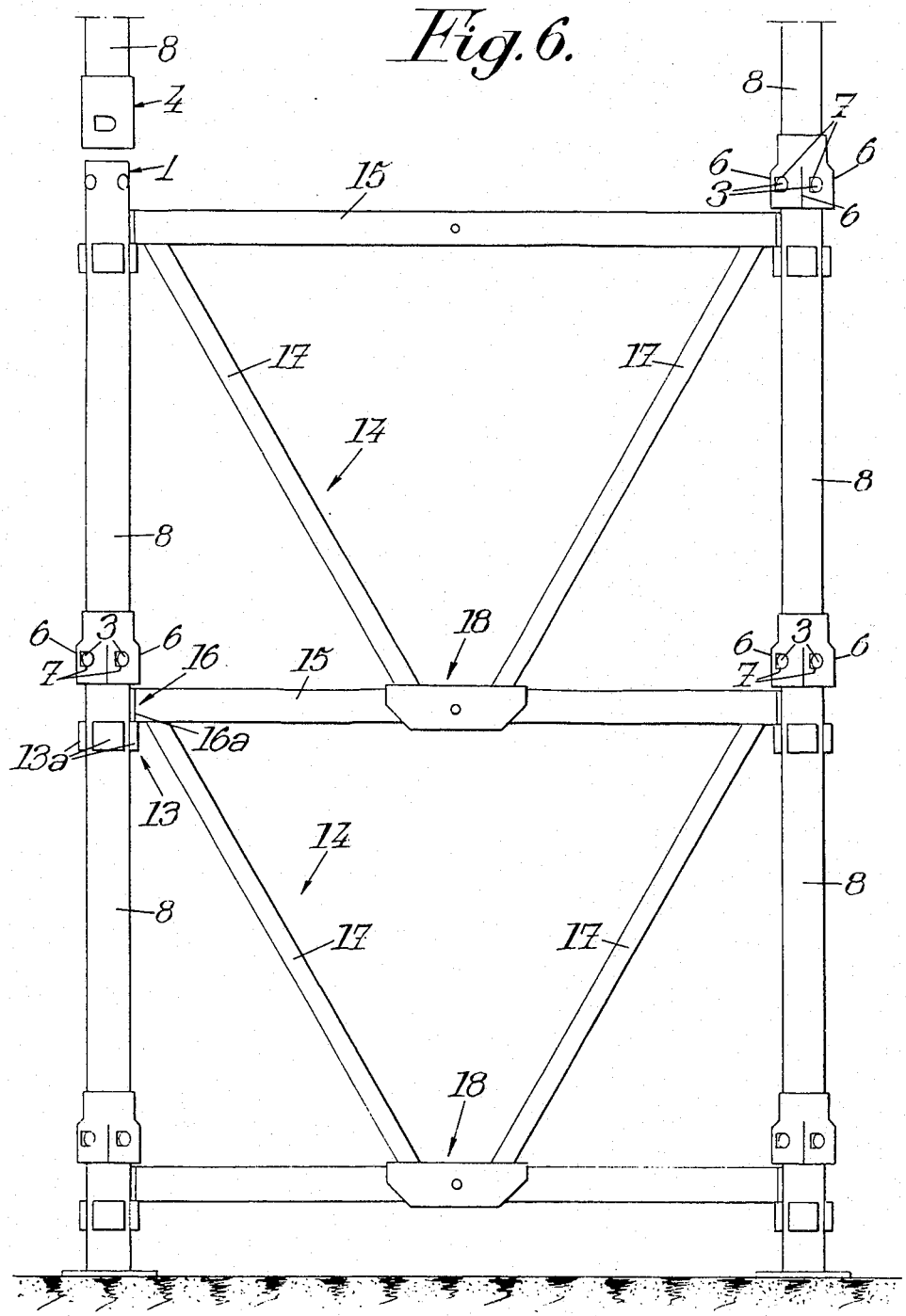
FIG. 6 shows a scaffolding formed by vertical uprights assembled by the assembly according to the invention.

Referring to FIGS. 1–3, the assembly comprises a male element 1 formed by a cylindrical section 2 having at least one radial catch 3, and a female element 4 which is adapted to receive the male element 1 and produce an axial locking effect once the male element 1 has been suitably encased in the female element 4 and a relative rotary movement has taken place between the male element 1 and the female element 4.

According to the invention the female element 4 is formed by a tubular section 5 having four deformed zones 6 extending axially from one 5a of the ends of the section 5 to a central region 5b of the section, and two or four perforate zones 7 disposed between such central region 5b and such end 5a, the perforate zones 7 being offset in relation to the deformed zone 6.

Each deformed zone 6 is deformed radially to allow the passage of the radial catch 3 of the male element 1, and each perforate zone 7 has an opening such that the catch 3 takes up position therein when the relative rotary movement has taken place between the male element 1 and the female element 4.

The four deformed zones 6 of the female element 4 are disposed at 90°, and the two or four perforate zones 7 are also disposed at 180° (diametrically opposite) or 90° respectively. In that case there are two catches 3 of the male element 1 (disposed at 180°) or four catches 3 (disposed at 90°).

The tubular section 5 forming the female element 4 initially has a cylindrical shape whose portion disposed between its central region 5b and its other end 5c retains its cylindrical shape so that it can be fitted and welded on to the end of a cylindrical tube scaffolding upright.

The assembly shown in FIGS. 1–5 comprises two deformed zones 6 and two perforate zones 7.

At the deformed zones 6 and the perforate zones 7 — i.e., between its central region 5b and its end 5a — the tubular section 5 is of square section (FIGS. 4 and 5); in contrast, between its central region 5b and its end 5a, the tubular section 5 has a circular cross-section which is fitted on to the end 8a of a scaffolding upright 8. A welding fillet 9 can be provided to connect the scaffolding upright 8 with the tubular section 5.

As shown in FIG. 1, the assembly has not yet been performed.

In FIGS. 2 and 4, the encasing has taken place between the male element 1 and the female element 4, but the axial locking has not yet taken place, since the female element 4 has not yet been given a rotary movement.

In FIGS. 3 and 5 the assembly has been performed, and the axial locking has come into effect, since the female element 4 has been given a rotary movement in relation to the male element 1 and the catches 3 have taken up position in the perforate zones 7.

FIG. 6 shows a scaffolding comprising vertical uprights 8 interconnected via assemblies according to the invention. The scaffolding is advantageously set up as indicated in my copending Patent application Ser. No. 282,147 filed Aug. 23, 1972 and now U.S. Pat. No. 3,835,612.

Each vertical upright 8 has attaching means 13 which are disposed laterally and can be formed by U-shaped members 13a attached, for instance, by welding, to the particular vertical upright 8, the U-shaped members 13a each co-operating with the vertical upright 8 to bound a passage 13b (FIGS. 1–3). Advantageously, four U-shaped members 13a can be provided, disposed at 90° in relation to one another at the same level.

Wind bracing frames 14 connect the vertical uprights 8 of the scaffolding via its attaching means 13.

To this end each wind bracing frame 14 comprises a horizontal cross-member 15 whose two ends have complementary attaching means 16 adapted to co-operate with the attaching means 13 of the vertical uprights 8. The complementary attaching means 16 can be formed by a claw 16a engaging in the passage 13b bounded by the vertical upright 8 and the U-shaped member 13a (FIGS. 1–3).

A wind bracing frame 14 of this kind also comprises two connecting cross-members 17 connected to the horizontal cross-member 15 and forming an isosceles triangle therewith.

The free ends of the two connecting cross-members 17 are interconnected and have locating means 18 (for instance, of the spindle type) disposed and constructed so as to connect such ends demountably to the horizontal cross-member 15 of the adjacent wind bracing frame 14.

The assembly according to the invention is then adapted to lock each horizontal cross-member 15 and prevent the complementary attaching means 16 from becoming disengaged from the attaching means 13.

In these conditions the catches 3 are disposed in quincunx in relation to the U-shaped members 13a of the attaching means 13.

In this way, when the female element 4 is rotated through 45° in relation to the male element 1, the four deformed zones 6 are disposed in alignment with the four U-shaped members 13a and therefore each form a stop for the horizontal cross-member 5 possibly engaged by one of its two claws 16a in one of the U-shaped members 13a.

Advantageously the radial catch 3 is of cylindrical shape and formed with two diametrically opposite chamfers 3a orientated parallel with the assembly axis.

Advantageously, the perforate zone 7 is given a shape of rectilinear outline, having on the side of the deformed zone 6 a rectilinear ridge 7a orientated parallel with the assembly axis, and on the side opposite from the deformed zone 6 a rounded ridge 7b matching the shape of the cylindrical radial catch 3.

Advantageously, to obtain a correct axial position between the male element 1 and the female element 4 the latter comprises a stop which the male element abuts and for which the or each catch 3 is disposed opposite the or each perforate zone 7.

Advantageously, the stop can be formed by the end 8a of the upright 8 to which the female element 4 is fitted and welded.

Lastly, whatever the embodiment adopted may be, the assembly according to the invention has in its female element properties of robustness which are much greater than those of the assemblies hitherto known.

Moreover, the assembly according to the invention can be made more cheaply than was possible in the case of the conventional assemblies.

Clearly, and as results from the foregoing, the invention is not limited to those methods of application and embodiment which have been more particularly considered but, on the contrary, the invention covers all variants within the scope of the following claims.

I claim:

1. In a bayonet-type connection comprising a male element formed by a cylindrical tubular section having at least one radial catch, and a female element adapted to receive such male element and produce an axial locking effect once the male element has been suitably encased in the female element and a relative rotary movement has taken place between the male and female elements the improvement that the female element is formed by a tubular section having at least one deformed zone extending axially from one of the ends of such section to a central region, and at least one perforate zone disposed between the central region and such end, the perforate zone being offset in relation to the deformed zone, the deformed zone radially outwardly enlarging the tubular section to allow the passage of the radial catch of the male element, and the perforate zone having an opening such that the radial catch takes up position therein when the relative rotary movement has taken place between the male and female elements.

2. The improved connection of claim 1, wherein the element is formed by a cylindrical tubular section having four deformed zones disposed at 90° between its central region and one of its ends, and two or four perforate zones disposed at 180° or 90° respectively, the portion of the cylindrical tubular section disposed between its central region and its other end retaining its cylindrical shape so that it can co-operate with the end of a cylindrical tube scaffolding upright constituting the male element having two or four catches disposed at 180° or 90° respectively.

3. The improved connection of claim 1 wherein each radial catch has a cylindrical shape and is formed with two diametrically opposite chamfers orientated parallel with the assembly axis.

4. The improved connection of claim 3 wherein each perforate zone has a shape of rectangular outline comprising on the deformed zone side a rectilinear ridge orientated parallel with the assembly axis, and on the side opposite from the deformed zone a rounded ridge matching the shape of the cylindrical radial catch.

5. The improved connection of claim 1 wherein the female element comprises a stop which the male element abuts and for which the or each catch is disposed opposite the or each perforate zone.

6. A scaffolding, comprising vertical uprights interconnected by the connections specified in claim 1.

7. A scaffolding according to claim 6, in which each vertical upright has attaching means adapted to receive complementary attaching means enabling the vertical uprights to be connected via wind bracing frames, wherein once the two adjacent vertical uprights have been assembled, the or each deformed zone of the female element forms a stop preventing the complementary attaching means of bracing frames from becoming disengaged from the attaching means of the vertical uprights.

* * * * *